April 3, 1956
G. R. WARD
2,740,928
MANUFACTURE OF ELECTRIC CAPACITORS
Filed Dec. 14, 1950
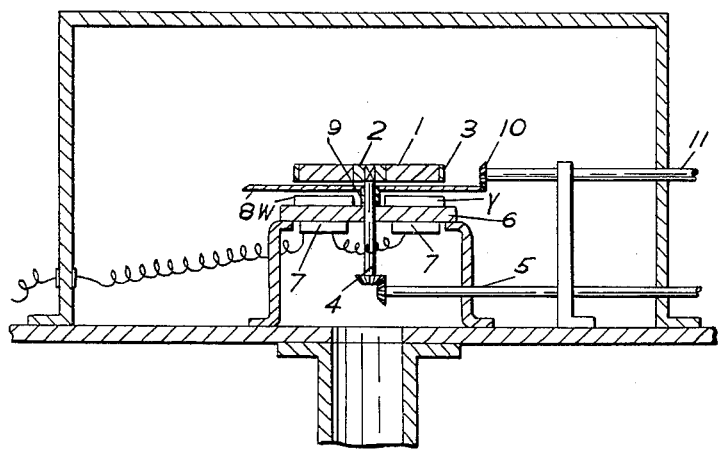
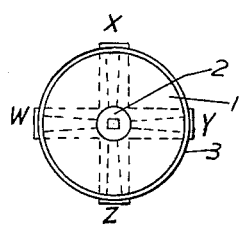
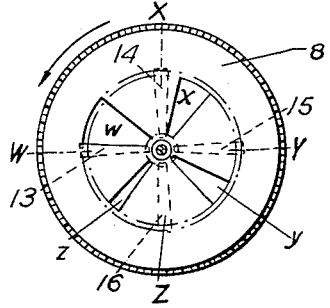
Inventor
George Richard Ward
Attorneys

United States Patent Office 2,740,928
Patented Apr. 3, 1956

2,740,928

MANUFACTURE OF ELECTRIC CAPACITORS

George Richard Ward, Wallasey, England, assignor to British Insulated Callender's Cables Limited, London, England, a British company Application December 14, 1950, Serial No. 200,849

Claims priority, application Great Britain January 30, 1950

10 Claims. (Cl. 317—261)

This invention relates to electric capacitors of the kind which comprise thin layers of metal and dielectric material interleaved with each other, at least two layers of each kind being used, so as to provide between two metal layers a comparatively large capacitance in a small volume.

The present invention provides a new method of manufacture for capacitors of this kind, which results in a new form of the product. In this the layers have no independent existence as strips but are formed in a helical shape, being built up on a suitable base by a deposition method, which permits of very thin layers being produced if desired. The deposition is carried out in a high vacuum.

In the new method, a supporting member, for instance a disc, is rotated in a vacuum chamber near a set of emitting devices which give out metal and dielectric as very fine particles. At least four streams of particles are produced by these devices, two being of metal and two of dielectric material, these being arranged alternately and shielded from each other. They are placed so as to operate on separate strips of the supporting member disposed radially to its axis of rotation. As rotation takes place superposed helical layers, alternately metal and dielectric material, are produced simultaneously on the supporting member.

The term "helical," here referred to, has its mathematical meaning. The helical layers are each bounded by helices of the same pitch but on inner and outer cylinders of substantially different radial dimensions and the trace of the surface on a plane containing the axis is a straight line at right angles to the axis. Since the helical layers are thin, the pitch of each helix will be very small: it may be measured in microns.

The emitting devices may be of the heated vapour type or of the cathode sputtering type. The former will generally be preferable. The thickness of each layer will depend on the surface speed of the supporting member on which the deposition is made, provided that other conditions are fixed. By adjusting other conditions, such as temperature, an additional control can be exerted which may be used to differentiate between the streams of material or to take care of the change in surface speed as the diameter of the capacitor is built up. It will probably generally be preferable to set all the conditions, except speed of rotation, initially and to obtain any regulation by adjusting this speed of rotation as the deposition proceeds.

In the choice of materials for deposition it will be obvious that the dielectric must be such as to have good electrical properties and that the metal and dielectric should be compatible with each other, that is to say, should adhere together without inter-penetration of adjacent layers. When using the vapour method, tin, zinc or aluminum is appropriate for the metal and silica or silica-containing material for the dielectric.

In the production of capacitors by this method, a flat surface, usually the face of a disc, is placed horizontally and is rotated about a central vertical axis over a set of emitting devices (at least four in number) which are alternately emitters of metal and dielectric material. They may, for instance, be arranged at 90° apart around the axis of rotation. They are shielded from each other so that they cause the deposit of material on regions which do not overlap at any instant in the process. It will be seen that with the emitters in operation and the surface in rotation, interleaved helices of metal and dielectric material in thin layers will be built up.

The arrangement of terminal connections which is preferred and generally will be found most advantageous is one in which one terminal is arranged in the centre of the surface, that is closely surrounding the axis of rotation, and the other is arranged near the periphery, that is near the outer limit of the region on which deposition takes place. For instance, the body on which deposition takes place may be a circular disc of ceramic material having a central circular piece of metal inserted, hereinafter referred to as a "hub," and having a ring of metal surrounding its outer periphery and flush with the surface of the ceramic body hereinafter referred to as a "rim." The central piece of metal may have a central hole by which the capacitor may be mounted. With this arrangement the two emitters of the dielectric material are so masked as to deposit in the region between the central metal piece and the outer rim, but not over either of them. One metal emitter is masked so that it deposits over an area including the outer metal rim and extending inward near to but not making contact with the central metal hub. The other metal emitter is masked so as to deposit over an area covering the central metal hub and extending outward near to but not contacting the metal rim. In this way the turns of one metal helix are all directly connected to the metal rim and the turns of the other metal helix are all connected to the central metal hub.

Although, as already stated, the layers of dielectric and metal are built up by simultaneous deposition on the supporting member, it is found generally convenient to initiate the deposition of each layer separately. This allows an increased staggering between the leading edges of the layers to be obtained as will be further explained in the following detailed description of examples. For the same reason the four or more streams of particles are preferably cut off successively at the end of the operation. It also guards against the possibility that the metal layers might make contact should the dielectric particle-streams not reach their full strength immediately.

An example of a method of manufacturing capacitors will be described with reference to the accompanying diagrammatic drawings in which Figure 1 is a side elevation partly in cross section of the apparatus and Figures 2 and 3 are plans of part of this apparatus.

The drawings show a form of apparatus for building up capacitors on the flat face of a disc 1 of insulating material provided with a metal hub 2 and a metal rim 3. This disc is mounted on the square end of a vertical spindle 4 driven through a spindle 5. There are four evaporators W, X, Y, Z equally spaced radially round the spindle 4 on a table 6 (Figure 2) and provided with electric heaters 7. A disc shaped mask 8 is loosely mounted, by means of a collar 9, on the spindle 4. The mask is independently driven step by step by means of a gear wheel 10, carried on a spindle 11 which engages with teeth formed on its periphery.

The mask 8 is formed with four slots $w$, $x$, $y$ and $z$ of varying width and length as indicated in Figure 3. Evaporators W and Y are used for evaporating metal and X and Z for dielectric material. Slot $w$ is of such a length that the metal particle stream emanating from evaporator W overlaps the rim 3 but not the hub 2 and slot y is of such a length that the particle stream emanating from evaporator Y overlaps the hub 2 but not the rim 3. Slots x and z are of an equal length which is such that the dielectric streams overlap neither the rim nor the hub.

The apparatus so far described is mounted inside a vacuum chamber 12 provided with an exhaust 13. Sources of power, for instance electric motors (not shown), for driving the spindles 5 and 11 may be mounted inside or outside of the vacuum chamber 12.

The method of manufacture is as follows. A disc 1 of insulating material, e. g., that sold under the trademark "Mycalex" and having a metal (e. g., brass) hub 2 and rim 3 is arranged on the spindle 4 as shown in Figure 1, the evaporators W and Y are partly filled with an easily evaporated metal such as zinc and evaporators X and Z with an evaporable dielectric such as glass or quartz. The vacuum chamber is exhausted to a high vacuum by means of a diffusion pump and the heaters 7 are switched on. When the materials in the evaporators W—Z begin to evaporate the drive for the spindle 4 is started so that the former rotates about its axis. The mask 8 is then rotated in steps in the direction of the arrow to uncover successively the four slots 13—16 in the evaporators W—Z (Fig. 3). The time interval between these steps is so related to the speed of rotation of the former 1 that the leading edges of the layers deposited are sufficiently spaced. The spacing, which is equivalent to the overlap of the ends of the foils and paper in a conventional wound type paper and foil capacitor, will vary in accordance with the use to which the capacitor is to be put. If all of the slots were opened simultaneously in the apparatus illustrated a spacing equal to 45° would be obtained. If the interval between the steps in the movement of the mask 8 is made equal to the time taken for the former 1 to rotate through 135° then this spacing will be equal to 180°. The thickness of the layers deposited can be varied by altering the speed of rotation of the former 1 or the rate of evaporation of the metal and dielectric.

The mask 8 also controls the widths of the layers deposited. The layer of metal deposited by the stream of particles emanating from compartment W will overlap the rim 3 but not the hub 2. The other metal layer will overlap hub 2 but not the rim 3. Both of the dielectric layers will extend between the hub and rim but will not overlap them. By this means the hub and rim act as terminals for the capacitor being formed and enable its capacitance to be measured continuously during its formation by the connection of a measuring device to the spindle 4 and to the rim 3 by sliding contacts.

When the capacitance reaches the required value the mask is returned in similar steps to those used at the initiation of the deposition to the position shown in Figure 3, the rotation of the former 1 is stopped and it is removed from the spindle 4. The removal from and the insertion of supporting members to the depositing position can be done to and from storage positions within the chamber or to and from the exterior of the chamber by way of air locks so as to avoid breaking the vacuum.

The supporting member will generally, with advantage, be made of circular shape, but this is not a necessary characteristic; other shapes may be adopted, for instance a square or polygon.

What I claim is:

1. An electric capacitor comprising a support with a flat surface and formed on said surface about an axis perpendicular to said surface, an annular body consisting of continuous helical layers ("helical" being used in its mathematical sense) alternately of a metal and a dielectric material adhering together and to said support, there being at least two metal layers and at least two dielectric layers.

2. An electric capacitor comprising a support with a flat surface and formed on said surface about an axis perpendicular to said surface, an annular body consisting of continuous helical vacuum deposited layers ("helical" being used in its mathematical sense) alternately of a metal and a dielectric material adhering together and to said support, there being at least two metal layers and at least two dielectric layers.

3. An electric capacitor comprising a disc shaped insulating support with a metal rim and a metal hub and formed on a flat surface of said disc about the axis of said disc, an annular body consisting of continuous helical layers ("helical" being used in its mathematical sense) alternately of a metal and a dielectric material adhering together and to said support, there being two metal layers one of which overlaps the rim and the other the hub and two dielectric layers which extend at least partially between said rim and hub and separate said metal layers, whereby said rim and said hub form terminals for said capacitor.

4. An electric capacitor comprising a disc shaped insulating support with a metal rim and a metal hub and formed on a flat surface of said disc about the axis of said disc, an annular body consisting of continuous helical vacuum deposited layers ("helical" being used in its mathematical sense) alternately of a metal and a dielectric material adhering together and to said support, there being two metal layers one of which overlaps the rim and the other the hub and two dielectric layers which extend at least partially between said rim and hub and separate said metal layers, whereby said rim and said hub form terminals for said capacitor.

5. The method of manufacturing an electric capacitor comprising a support and at least four superposed helical layers alternately of metal and dielectric material adhering together and to said support which comprises rotating a support having a flat face about an axis perpendicular to said face in a vacuum chamber in the path of at least two streams of metal particles and at least two streams of dielectric particles emanating from heated sources of metal and dielectric and operating simultaneously on separate, alternate strips of said face radial to said axis of rotation.

6. The method of manufacturing an electric capacitor comprising a support and four superposed helical layers alternately of metal and dielectric material adhering together and to said support which comprises rotating a disc shaped insulating support having a metal rim and a metal hub about its axis in a vacuum chamber in the path of two streams of metal particles and two streams of dielectric particles emanating from heated sources of dielectric and metal acting simultaneously on separate alternate strips of said support radial to its axis, the shape of said streams being such that said strips on which said dielectric particles act extend at least partially between said metal rim and hub and one of said strips on which said metal particles act overlaps the rim and the other overlaps the hub.

7. The method of manufacturing an electric capacitor comprising a support and at least four superposed helical layers alternately of metal and dielectric material adhering together and to said support which comprises rotatably mounting a support with a flat face in a vacuum chamber, successively initiating in said chamber at least two streams of metal particles and at least two streams of dielectric particles emanating from heated sources of dielectric and metal and operating said streams simultaneously, after they have been successively initiated, the shape of said streams being such that they operate on separate, alternate strips of the said support radial to an axis perpendicular to said face and rotating said support about said axis.

8. The method of manufacturing an electric capacitor comprising a support and at least four superposed helical layers alternately of metal and dielectric material adhering together and to said support which comprises rotating a support having a flat face about an axis perpendicular to said face in a vacuum chamber in the path of at least two streams of metal vapour and at least two streams of dielectric vapour operating simultaneously on separate, alternate strips of said face radial to said axis of rotation.

9. The method of manufacturing an electric capacitor comprising a support and four superposed helical layers alternately of metal and dielectric material adhering together and to said support which comprises rotating a disc shaped insulating support having a metal rim and a metal hub about its axis in a vacuum chamber in the path of two streams of metal vapour, each acting on a separate strip of said support radial to its axis one overlapping the rim and the other the hub, and two streams of dielectric vapor acting on separate strips of said support radial to its axis, alternating, in the direction of rotation of the disc, with the strips on which the metal vapour streams act and each extending at least partially between said metal rim and hub.

10. The method of manufacturing an electric capacitor comprising a support and at least four superposed helical layers alternately of metal and dielectric material adhering together and to said support which comprises mounting a support with a flat face in a vacuum chamber, rotating said support about an axis perpendicular to said face, successively initiating in said chamber a first stream of metal vapour, a first stream of dielectric vapour, a second stream of metal vapour and a second stream of dielectric vapour, said streams being directed on to separate strips of said support radial to said axis and spaced around said axis in the sequence in which said streams are initiated.

References Cited in the file of this patent

UNITED STATES PATENTS

| | | |
|---|---|---|
| 1,563,440 | Russell | Dec. 1, 1925 |
| 1,611,756 | Leigh | Dec. 21, 1926 |
| 1,784,611 | Polanyi et al. | Dec. 9, 1930 |
| 2,171,231 | Braunschweig | Aug. 29, 1939 |
| 2,225,855 | Brown | Dec. 24, 1940 |
| 2,373,639 | Turner | Apr. 10, 1945 |
| 2,432,950 | Turner et al. | Dec. 16, 1947 |
| 2,456,241 | Axler | Dec. 14, 1948 |
| 2,482,329 | Dinnick | Sept. 20, 1949 |
| 2,501,563 | Colbert | Mar. 21, 1950 |
| 2,508,500 | De Lange | May 23, 1950 |
| 2,614,524 | Haynes | Oct. 21, 1952 |

FOREIGN PATENTS

| | | |
|---|---|---|
| 594,224 | Great Britain | Nov. 5, 1947 |